July 28, 1959 — J. S. PRICE — 2,896,859
IRRIGATION APPARATUS
Filed Feb. 28, 1955 — 3 Sheets-Sheet 1

INVENTOR.
Joel S. Price
BY Jerry Dunlop
ATTORNEY

July 28, 1959

J. S. PRICE 2,896,859

IRRIGATION APPARATUS

Filed Feb. 28, 1955

INVENTOR.
Joel S. Price

BY

Jerry Dunlap

ATTORNEY

July 28, 1959  J. S. PRICE  2,896,859
IRRIGATION APPARATUS
Filed Feb. 28, 1955  3 Sheets-Sheet 3

INVENTOR.
Joel S. Price
BY
Jerry Dunlap
ATTORNEY

United States Patent Office 2,896,859
Patented July 28, 1959

2,896,859
IRRIGATION APPARATUS

Joel S. Price, Oklahoma City, Okla.

Application February 28, 1955, Serial No. 490,903

8 Claims. (Cl. 239—213)

This invention relates to improvement in irrigation apparatus.

In irrigating a field, it is a common practice to lay a main irrigation line of relatively large diameter, such as six inches, down the center of the field along its longest dimension. These main lines are provided with special T-valve couplers, usually every sixty feet, to facilitate connection of lateral lines. The main lines are, of course, connected to a source of water supply, such as an irrigation well. A lateral line of slightly smaller diameter, and of a length to extend from the main line to substantially the edge of the field, is connected to one of the end T-valve couplers. The lateral line is provided with a plurality of sprinklers spaced substantially every thirty feet to irrigate a strip of land from forty to sixty feet in width and extending over one-half the width of the field. After one strip of land has been irrigated, the lateral line is moved to the next T-valve coupler for irrigating an adjacent strip of land. The laterals are sometimes moved by hand, however, each lateral line is ordinarily supported by a plurality of wheels secured around the line in aligned and spaced relation to facilitate moving the lateral. Furthermore, large wrenches must be used for rolling the lateral to its various positions, and in the usual case, the services of at least two men are required. In this type of installation separate lateral lines must be provided on each side of the main line since the laterals can be moved only along the length of the field and cannot be switched to the opposite side of the main line.

The principal shortcomings of the present day irrigation apparatuses lie in the difficulty of moving the laterals and the effect of wind on the laterals, as well as the water sprays from the sprinklers. As mentioned above, it ordinarily requires the services of at least two men for moving a lateral. Furthermore, after the apparatus has been in operation, the soil is wet and muddy to add to the difficulty of moving the lateral, either by hand or by wheels, and the workmen cause damage to growing plants. During periods of high winds, the wheel supported laterals are frequently blown loose from the main line and rolled down the length of the field, resulting in substantial damage to the irrigation apparatus. In addition, during variations in wind velocity the sprays coming from the sprinklers are blown in various directions to frequently leave dry strips in the field and multiple irrigation of other strips. Furthermore, the wheel-supported laterals are extremely difficult to move over rolling or uneven terrain.

The present invention contemplates a novel irrigation apparatus for more effectively and efficiently irrigating a field. It is contemplated to provide a square or rectangular portable apparatus by utilizing the irrigation pipe or conduits as the main frame of the apparatus, as well as for conducting the irrigating water. With the present apparatus, substantially an entire acre of ground may be irrigated in one position of the apparatus and the apparatus need be moved a minimum number of times for irrigating a field. The apparatus will not be substantially affected by wind and the sprays of water may be retained in substantially a uniform fashion during varying wind velocities. Furthermore, the present apparatus will provide a substantial saving in the length of the main line, and lateral lines, as well as the number of valves and fittings required for the main line.

An important object of this invention is to facilitate the irrigation of large fields.

Another object of this invention is to provide a novel irrigation apparatus utilizing the flow conduits as interconnecting and supporting means for the apparatus.

A further object of this invention is to provide an irrigation apparatus which will not be materially affected by wind.

Another object of this invention is to irrigate large fields with a minimum expense and with a minimum of man power.

Still another object of this invention is to provide a portable irrigation apparatus which may be easily moved over uneven terrain without damage to the apparatus, and which will obtain an even distribution of the irrigating fluid.

Another object of this invention is to provide a novel irrigation apparatus requiring a minimum length for the main line and which may be moved to opposite sides of a field without crossing the main line.

A still further object of this invention is to provide a simply constructed irrigation apparatus which may be economically manufactured.

Another object of this invention is to eliminate the necessity of moving an irrigation apparatus over the entire length of a field when the irrigation operation is to be repeated.

Other objects and advantages of the invention will be evident from the following detailed description, when read in conjunction with the accompanying drawings which illustrate my invention:

Figure 1:
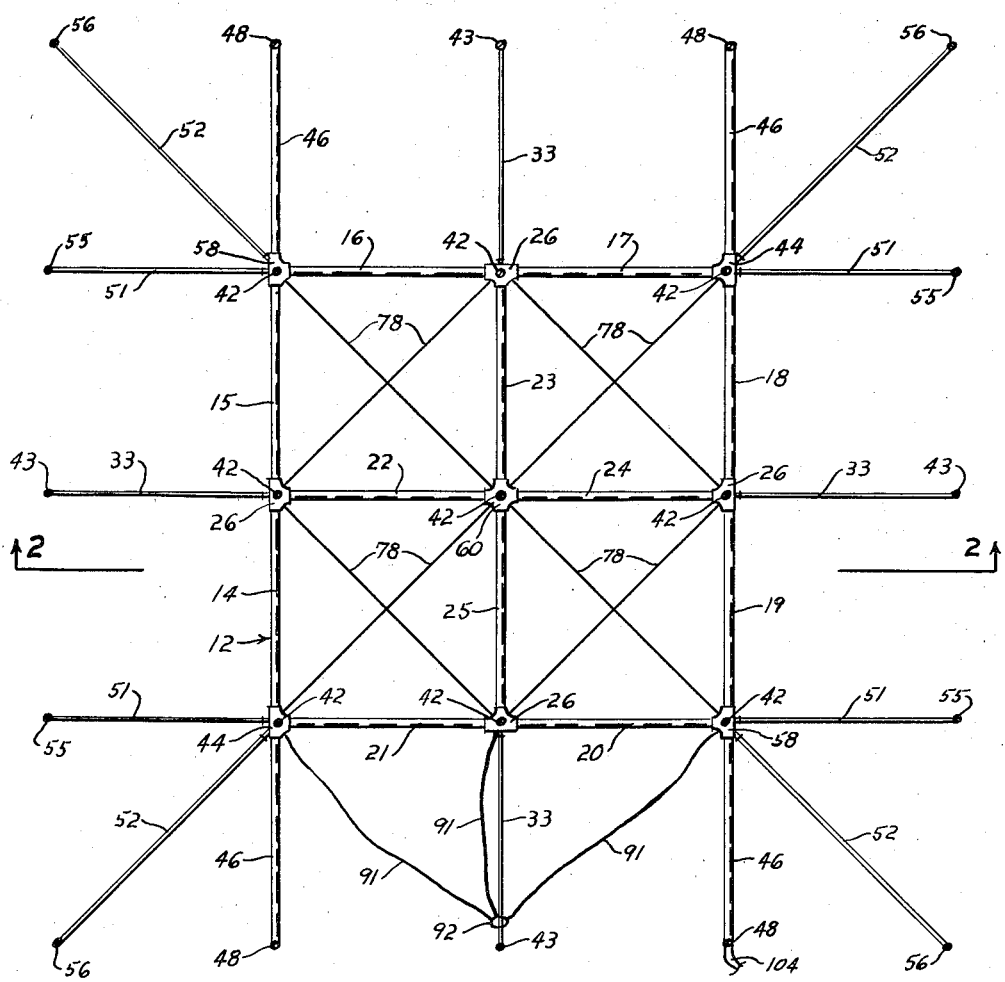
Figure 1 is a plan view of my irrigation apparatus, with certain details of construction removed for clarity.

Referring to the drawings in detail, and particularly Figure 1, reference character 12 generally designates my novel irrigation apparatus comprising a plurality of irrigation pipes or conduits 14 through 21 interconnected in substantially a square configuration. Similar pipes 22 through 25 are connected to the above-mentioned conduits in crossing relation, providing a frame having four smaller squares within the large square configuration described above.

Figure 6:
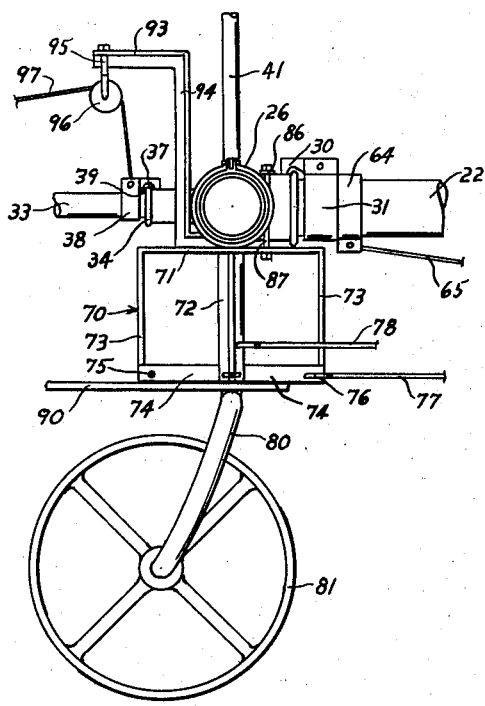
Figure 6 is an enlarged elevational view of the fitting shown in Figure 3, along with its supporting caster assembly.
Figure 3:
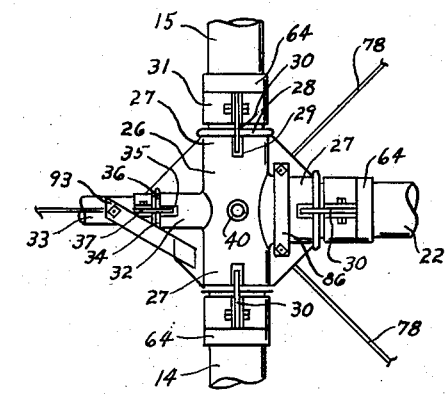
Figure 3 is a detailed plan view of one of the pipe fittings utilized in the present apparatus.

The conduits 14, 15 and 22 are interconnected by an irrigation pipe fitting 26 shown in Figures 3 and 6. The fitting 26 has three pipe sockets or outlets 27 for receiving the adjacent ends of the pipes 14, 15 and 22. Each outlet 27 has an outwardly extending circumferential flange 28 around the end thereof and a groove 29 in the upper surface of the outlet inwardly of the flange 28. Each groove 29 receives the inner end of a hook or latch 30 pivotally secured to the respective irrigation pipe. The latches 30 are pivotally carried by split bands or brackets 31 extending around the respective irrigation pipe in a position to extend over the flange 28 into the groove 29, thereby loosely securing the irrigation pipes 14, 15 and 22 in the sockets 27. In addition, each socket 27 is preferably provided with a gasket or sealing ring (not shown) in the inner periphery thereof to provide a seal around the respective irrigation pipe, in a manner common to present day irrigation pipe fittings. It is, therefore, apparent that the pipes 14, 15 and 22 are secured in the fitting 26 in such a manner that the pipes can flex or pivot in the fitting, preferably through approximately a five degree arc. That is, each of the pipes 14, 15 and 22 is swively secured in the fitting 26 in such a manner that each pipe can swing through approximately a five degree arc in any direction.

The fitting 26 is also provided with a smaller socket 32 extending outwardly in an opposite direction to the socket 27 containing the conduit 22, for receiving one end of a smaller diameter conduit 33. A flange 34 is formed around the outer end of the socket 32 and a groove 35 is formed in the upper surface of the socket inwardly of the flange 34. It will also be observed that a slot 36 is cut through the flange 34 in circumferentially spaced relation to the groove 35. A hook or latch 37 is pivotally secured to the pipe 33 by a split band or bracket 38, and is of a length to extend over the flange 34 into the groove 35. The latch 37 has a tapered surface 39 formed on the underside thereof (see Figure 6) arranged to contact the flange 34 upon inward movement of the pipe 33 for raising the latch 37 out of the groove 35. The pipe 33 can then be rotated to align the latch 37 with the slot 36, whereupon the pipe 33 may be moved lengthwise out of the socket 32. As in the sockets 27, a sealing ring (not shown) is preferably secured in the inner periphery of the outlet 32 to provide a seal around the pipe 33 and permit pivotal movement of the pipe 33 with respect to the fitting 26. The pipe 33 is preferably the same length as the pipes 14 to 25.

From Figure 1, it will be observed that a fitting 26 is also utilized on the opposite side of the apparatus 12 to interconnect the conduits 18, 19 and 24 and another outwardly extending pipe 33. Furthermore, another fitting 26 is used to interconnect the pipes 16, 17 and 23, and still another fitting 26 interconnects the pipes 20, 21 and 25. Each of the last two fittings 26 also receive pipes 33.

Figure 2:
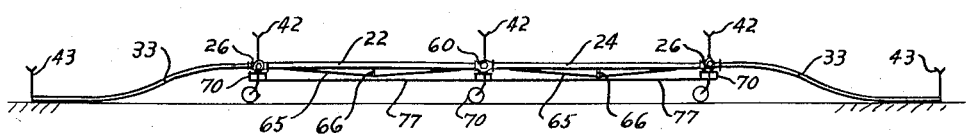
Figure 2 is a sectional view taken along lines 2—2 of Figure 1.

Each fitting 26 has a small threaded outlet 40 (Figures 3 and 6) in the upper central portion thereof to receive a riser 41. A suitable sprinkler 42 (Figures 1 and 2) is secured on the upper end of each riser 41. In addition, each of the smaller pipes 33 has a similar riser and sprinkler assembly 43 on the outer end thereof (as shown in Figure 2). Each pipe 33 is suitably plugged (not shown) at the outer end thereof, outwardly of the sprinklers 43, to prevent leakage of the irrigation water.

Figure 4:
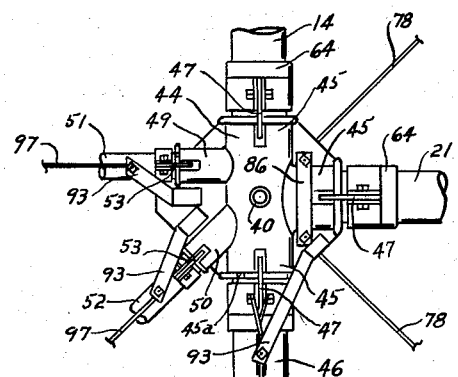
Figure 4 is a detailed plan view of another type of pipe fitting used.

The pipes 14 and 21 are interconnected by a fitting 44 as shown in Figure 4. The fitting 44 has three outlets 45 constructed in substantially the same manner as the outlets 27 of the fitting 26 to receive the adjacent ends of the pipes 14 and 21, as well as the inner end of a similar pipe 46. Latches 47 are secured to the pipes 14, 21 and 46 in the same manner as the latches 30 on the pipes 14, 15 and 22 to engage the outlets 45 and pivotally secure the pipes 14, 21 and 46 to the fitting 44. The pipe 46 is preferably the same size in both length and diameter as the pipes 14 and 21 and extends outwardly from the fitting 44 in aligned relation with the pipe 14. The outer end of the pipe 46 is covered with a suitable removable plug (not shown) and has an upwardly extending riser and sprinkler assembly 48 (Figure 1) thereon. Furthermore, the outlet 45 utilized for receiving the pipe 46 is provided with a slot 45a (Figure 4) in the outer end thereof to receive the respective latch 47 during removal of the pipe 46 as will be hereinafter set forth.

A pair of smaller outlets 49 and 50 are also provided on the fitting 44 to receive the inner ends of a pair of small pipes 51 and 52 respectively. The outlet 50 extends outwardly from the fitting 44 at approximately a forty-five degree angle to direct the pipe 52 at an oblique angle to the main portion of the apparatus 12 for purposes as will be hereinafter set forth. The outlet 49 extends outwardly from the fitting 44 in a parallel relation to the pipe 21 to position the pipe 51 parallel with the pipe 33. Latches 53 are pivotally secured to the inner ends of the pipes 51 and 52 to removably engage the outlets 49 and 50. The latches 53 are preferably constructed in the same manner as the latches 37 of the pipes 33, and the outlets 49 and 50 preferably constructed in the same manner as the outlets 32 of the fittings 26. It will, therefore, be seen that the pipes 51 and 52 may be removed from the fitting 44 in a manner similar to the method of removing the pipes 33 from the fittings 26. The pipe 51 is preferably of the same length as the pipes 33 and has a riser and sprinkler assembly 55 (Figure 1) on the outer end thereof; whereas, the pipe 52 is of a length to position the outer end thereof in alignment with the sprinkler assemblies 43 and 55 of the pipes 33 and 51 respectively. A suitable riser and sprinkler assembly 56 is secured on the outer end of the pipe 52, and the extreme outer ends of both of the pipes 51 and 52 are suitably plugged (not shown).

In referring to Figure 1, it will be apparent that a fitting 44 is also used on the opposite corner of the apparatus 12 to receive similar conduits 46, 51 and 52, and interconnect the pipes 17 and 18. The fittings 58 used in the remaining two corners of the apparatus 12 are constructed in substantially the same manner as the fittings 44, except that they are opposite-hand to the fittings 44. Therefore, the fittings 58 are not shown in detail herein. It will be understood that the fittings 58 receive and support two more sets of pipes 46, 51 and 52. Also, each of the fittings 44 and 58 has a threaded outlet 40 (Figure 4) in the upper central surface thereof to receive a riser 41 (Figure 1) and sprinkler 42.

Figure 5:
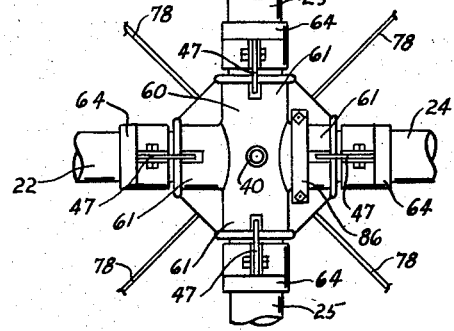
Figure 5 is a detailed plan view of still another pipe fitting utilized in the present apparatus.

The irrigation pipes 22 to 25 are connected in communicating relation at their inner ends by another fitting 60. Referring to Figure 5, it will be noted that the fitting 60 is in the form of a cross, having four equally spaced sockets 61. The sockets 61 are formed in the same manner as the sockets 27 of the fittings 26 to receive the inner ends of the pipes 22 to 25. Also, another latch 47 is pivotally secured to the inner end of each of the pipes 22 to 25 to engage the respective socket 61 and pivotally secure the pipes 22 to 25 to the fitting 60. The fitting 60 has the usual threaded outlet 40 in the top thereof to receive another riser 41 and sprinkler 42. It will be understood that each of the fittings 26, 44, 58 and 60 is hollow to provide communication between the various outlets thereof.

It will thus be apparent that the pipes 14 to 25 form a frame for the apparatus 12 and are interconnected in such a manner to flex during movement of the apparatus over uneven terrain, as will be more fully hereinafter set forth. Also, the pipes 14 to 25 are preferably formed out of a light-weight material, such as aluminum, and are inherently flexible. When made of aluminum, the pipes 14 to 25 normally sag when held only at their opposite ends. Therefore, it is desirable to provide a clamp 64 (Figures 3-6) at each end of each of the pipes 14 to 25 adjacent to the latch mechanisms 47 to receive the opposite ends of a cable or strut 65. Each cable 65 (see also Figure 2) extends downwardly through the lower end of a drain conduit 66 extending downwardly at the center of the respective pipe, and is retained taut to support the pipes 14 to 25 in substantially horizontal positions. Also, each drain conduit 66 contains a suitable automatic drain valve (not shown) to drain the pipes 14 to 25 when the flow of fluid through the pipes is stopped, as will be hereinafter described.

Figure 7:
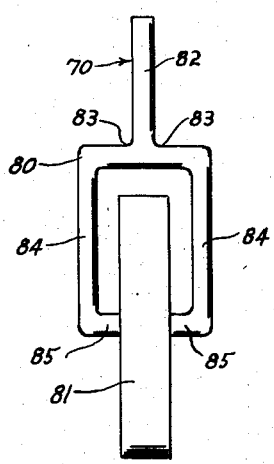
Figure 7 is a front elevational view of the wheel and yoke portion of a caster assembly.

Each of the fittings 26, 44, 58 and 60 is mounted on a caster assembly 70 as illustrated in Figures 6 and 7. Each caster assembly 70 comprises a square-shaped bed plate 71 having a tube or pipe 72 depending from the central portion thereof. A rod 73 extends downwardly from each corner of each plate 71 and is supported at its lower end on an outwardly extending bar or arm 74. The arms 74 extend radially outward from the respective tube 72 in equally spaced relation. An aperture 75 is formed in each arm 74 of a size to receive a clevis 76 secured to the end of a cable or strut 77. The cables 77 are stretched between the adjacent caster assemblies 70 below the pipes 14 to 25, as shown in Figure 2, to brace the apparatus 12. In addition, cables 78 (Figure 6) are secured to the tubes 72 and extend in crossing relation between the various caster assemblies 70 as shown in Figure 1 to further brace the apparatus 12.

A yoke 80 (Figures 6 and 7) having a wheel 81 therein, forms the lower portion of each caster assembly 70. Each yoke 80 is preferably formed out of pipes or rods and has a vertical standard 82 extending upwardly into the respective tube 72. The tubes 72 are of a size to slidingly receive the standards 82 and rest on the shoulders 83 of the yoke 80. As clearly shown in Figure 7, the yoke 80 is bifurcated to provide two spaced, downwardly extending arms 84. The arms 84 are curved longitudinally to off-set the wheel 81 from the center line of the respective standard 82, as in the usual caster arrangement. The lower ends 85 of the arms 84 are bent inwardly toward one another to rotatably support the respective wheel 81.

It will thus be apparent that the standards 82 may be turned in the respective tubes 72 to permit relatively free directional turning movement of the wheels 81, whereby the apparatus 12 may be pulled in any desired direction. Each of the fittings 26, 44, 58 and 60 is secured to the bed plate 71 of the respective caster assembly 70 by a strap or bar 86 (Figure 6) extending over one of the outlets of the respective fitting. Each strap 86 has a bolt 87 extending downward from each end thereof into engagement with the respective bed plate 71. Therefore, the fittings 26, 44, 58 and 60 are securely mounted on the caster assemblies 70 to efficiently support the apparatus 12.

An apertured pulling bar 90 (Figure 6) is rotatably disposed on the standard 82 below the tube 72 of the caster assemblies 70 supporting the fittings 26, 44 and 58. The bars 90 are adapted (not shown) to connect with the cables 91 (Figure 1) of a pulling bridle 92. By having a pulling bar 90 on each of the outermost caster assemblies 70, the bridle 92 may be connected to any side of the apparatus 12 for pulling the apparatus in any desired direction, and the pulling force will be distributed over an entire side of the apparatus. The bars 90 can be turned at any desired angle to the caster assemblies 70, and will not interfere with the operation of the apparatus 12.

Each caster assembly 70 supporting the fittings 26, 44 and 58 is also provided with pulley assemblies 93 (Figures 3, 4 and 6) to facilitate handling the removable pipes 33, 46, 51 and 52. The pulley assemblies 93 are each provided with a supporting arm 94 extending upwardly from the respective bed plate 71 to a point substantially directly over the inner end of the respective removable pipe as illustrated in Figure 6. A swivel type clevis 95 depends from the outer end of each arm 94 to pivotally support a sheave 96 over the respective removable pipe, such as the pipe 33 shown in Figure 6. Each sheave 96 has a rope or cable 97 threaded therethrough, and each cable 97 is secured at its opposite ends to the opposite ends of the respective removable pipe. It will thus be apparent that a pull on the outer end of a rope 97 will tend to raise and support the inner end of the respective removable pipe through the rope 97 and pulley assembly 93. A pulley assembly 93 is provided on the caster assemblies 70 for each of the removable pipes 33, 46, 51 and 52.

*Operation*

Figure 10:
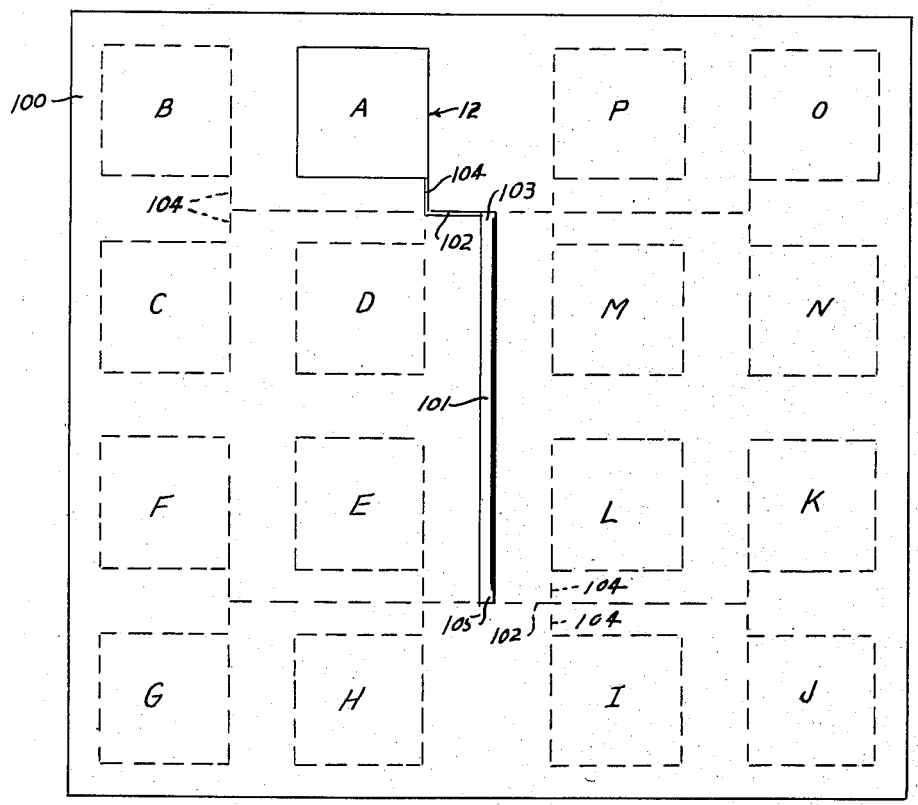
Figure 10 is a diagrammatic illustration of a large field showing a typical use of my apparatus.

Figure 10 diagrammatically illustrates a rather large field 100 having a main irrigation line 101 laid down the center line thereof, and it will be assumed that the main line 101 is connected to an irrigation water supply (not shown). In utilizing the present invention, the apparatus 12 may be first placed in the position shown by solid lines in Figure 10 and designated by letter A. Although not shown in Figure 10, it should be noted that it is desirable to position the apparatus 12 whereby the large removable pipes 46 (Figure 1) are parallel to the main line 101. A lateral line 102 is then connected to the adjacent end 103 of the main line 101 and extended at right angles to the main line. The outer end portion of the lateral 102 may be directed toward the adjacent pipe 46 and connected directly thereto. However, it is preferable that a flexible hose 104 be used between the lateral 102 and the adjacent pipe 46 to facilitate positioning of the apparatus 12. It will be assumed that the removable pipes 33, 46, 51 and 52 are in their operating positions as shown in Figure 1.

When water is supplied through the main line 101, it flows through the lateral 102, hose 104 and connected pipe 46 into the apparatus 12. The water will then be directed through each of the pipes 14 to 25 forming the frame of the apparatus 12, as well as into the removable pipes 33, 46, 51 and 52. Therefore, the sprinklers 42, 43, 48, 55 and 56 will be operated simultaneously to spray the irrigation water over a large, substantially square, area of the field 100 adjacent to the end 103 of the main line 101. The apparatus 12 is retained in position A until the area covered thereby is sufficiently irrigated, whereupon the supply of water to the lateral 102 is discontinued.

Figure 8:
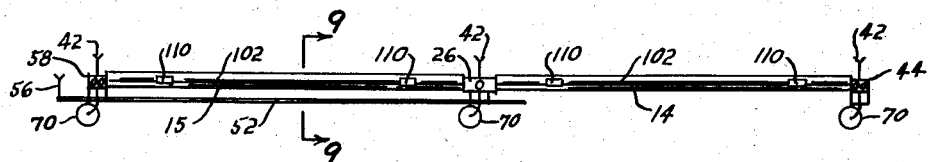
Figure 8 is an elevational view of my apparatus illustrated in a position for moving.
Figure 9:
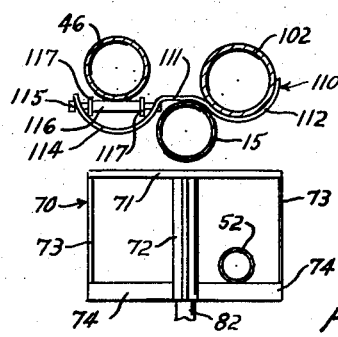
Figure 9 is a partial sectional view as taken along lines 9—9 of Figure 8.

As the pressure in the pipes 14 to 25 is decreased to a relatively low pressure, such as five pounds, the water is automatically drained therefrom through the drain connections 66 (Figure 2). Suitable stop-cocks (not shown) may be provided in the outer ends of the removable pipes 33, 46, 51 and 52, if desired, to facilitate draining the entire apparatus 12. The hose 104 is then disconnected from the respective pipe 46 and the removable pipes 33, 46, 51 and 52 are placed on the fixed portions of the apparatus 12 as shown in Figures 8 and 9 for movement of the apparatus 12 to position B.

The outer end of each of the removable pipes 33 is separately manually raised, and the pipe is pushed into the respective socket 32 (Figures 3 and 6) until the tapered surface 39 of the latch 37 contacts the flange 34 of the socket 32 to disengage the latch 37 from the groove 35. The respective rope 97 is then pulled taut by the operator and the pipe 33 is rotated to align the latch 37 with the slot 36 in the flange 34; whereupon the pipe 33 is pulled out of the respective socket 32. The operator may then pull on the outer end of the rope 97 to raise the inner end of the pipe 33 above the respective fitting 26, whereby the pipe 33 may be pushed inwardly over the apparatus 12 and placed on a pair of racks 110. As the pipe 33 is pushed inwardly, the rope 97 runs through the sheave 96 to assist in supporting the pipe 33. Each of the remaining removable pipes 46 and 51 is removed and racked in a similar manner.

The racks 110 (see Figure 9) may consist of straps 111 secured to the upper surfaces of the pipes 14 to 25 in spaced relation along the pipes. As shown in Figure 8, it is preferable that two racks 110 are provided on each of the pipes 14 to 25. Each strap 11 extends outwardly on opposite sides of the respective supporting pipe and is bent on the arc of a circle to provide receptacles 112 and 114 on opposite sides of the supporting pipe. The receptacle 112 is of a size to receive and support any of the removable pipes 33, 46 or 51, as well as sections of the lateral line 102 if desired. The opposite receptacle 114 is apertured (not shown) to receive a bolt 115 extending transversely through the strap 111. A small pipe or tube 116 is slidingly telescoped over the bolt 115, and a pair of rollers 117 are positioned on the bolt 115 at the opposite ends of the tube 116. The tubes 116 provide rolling supports for the removable pipes (such as pipe 46 in Figures 8 and 9) to facilitate the racking of the removable pipes. The rollers 117 serve to guide the movable pipes on the tubes 116.

The longer removable pipes 52 (see Figure 4) are removed from the respective outlets 50 in the same manner as that described above for the pipes 33. However, upon removal of each pipe 55 from its respective socket 50, the respective rope 97 is slackened to lower the inner end of the pipe 52 below the respective fitting 44 or 58. The particular pipe 52 is then pivoted horizontally with respect to the apparatus 12 (this may be done by the operator carrying the outer end of the pipe 52) until the pipe 52 is aligned with one side of the apparatus 12; whereupon the pipe 52 is inserted through the adjacent caster assembly 70 and into the next caster assembly 70 as shown in Figures 8 and 9. The pipe 52 may be passed between one of the rods 73 and the tube 72 and placed on the arm 74. Each pipe 52, being longer than the pipes 14 to 25 will extend through two of the caster assemblies 70, whereby the pipes 52 will be adequately supported for movement of the apparatus 12.

When all of the removable pipes 33, 46, 51 and 52 have been racked as described above, the three cables 91 of the bridle 92 are connected to the pulling bars 90 on one side (the left side as shown in Figure 10) of the apparatus 12. The bridle 92 is then pulled to the left, either by hand or by a vehicle such as a tractor or jeep (not shown), until the apparatus 12 is moved to position B. The bridle 92 may be of any desired length, and is preferably of a length to permit the pulling vehicle to be positioned on a dry surface when moving the apparatus 12 from position A.

Upon positioning the apparatus 12 in position B, the removable pipes 33, 46, 51 and 52 are reassembled and connected to the various fittings into the positions shown in Figure 1. For example, each pipe 33 is pulled lengthwise from the respective racks 110 by the operator, and the operator simultaneously retains the respective cable 97 taut. Upon removal of the pipe 33 from the racks 110, the inner end of the pipe is lowered into alignment with the respective outlet or socket 32 (Figures 3 and 6); whereupon the inner end of the pipe 33 is inserted in the socket 32 and the latch 37 is forced outwardly over the flange 34. The pipe 33 is then rotated until the latch 37 drops into the groove 35, and the operator lowers the outer end of the pipe 33 onto the ground. The respective riser and sprinkler apparatus 43 will then extend upwardly as shown in Figure 2. The inherent flexibility of the pipes 33, along with their swivel connection to the sockets 32, permits their bending as illustrated in Figure 2 without damage. The remaining removable pipes 46, 51 and 52 are assembled in a similar manner to prepare the apparatus 12 for a sprinkling operation. If desired, a guiding skirt (not shown) may be provided on the bottom of each outlet receiving a removable pipe to facilitate assembly of the removable pipes.

The lateral 102 is then lengthened by the addition of joints as illustrated by dotted lines in Figure 10; whereupon the hose 104 is connected to the outer end of the lateral 102 and the end of the pipe 46 nearest the main line 101. When water pressure is again directed through the lateral 102, the apparatus 12 irrigates a substantially square portion of the field 100 adjacent to the previously irrigated plot, in the same manner set forth above.

Upon completion of the irrigation at position B, the dismantling operation described above is repeated and the apparatus 12 is moved parallel to the main line 101 to position C. It will be observed that the bridle 92 must be connected to the lower side of the apparatus 12 as shown in Figure 10 for moving the apparatus from B to C. The removable pipes 33, 46, 51 and 52 are then again assembled, and the hose 104 is connected to the upper pipe 46 (as viewed in Figure 10) nearest the main line 101 to repeat the irrigation operation.

The above-described cycles are repeated to position H for irrigating one-half of the field 100. In the event only one apparatus 12 is available, it may be moved from position H to position I since the main line 101 does not extend over the entire length of the field 100. The apparatus 12 may be moved over the remaining side of the field 100 from the position I to the position P in the sequence indicated by the letters I through P to complete the irrigation of the field 100. It will be observed in Figure 10 that the lateral 102 must be moved and reconnected to the main line 101 only once for every two movements of the apparatus 12 along the length of the main line, thereby retaining the number of valve connectors (not shown) in the main line at a minimum.

The spaced relation of the successive positions of the apparatus 12 illustrated in Figure 10 results from the fact that the outermost sprinklers 43, 48, 55 and 56 (Figure 1) will spray the irrigation water substantially beyond the area physically covered by the apparatus 12. The precise area irrigated by the apparatus 12 in a given position will, of course, depend upon the lengths of the various pipes and sizes of sprinklers but may be fairly closely calculated. For example, when the pipes 14 to 25, 33, 46 and 51 are forty feet long (the pipes 52 will then be approximately fifty-five and one-half feet long), and the various sprinklers will spray an area forty feet in diameter, the apparatus 12 will irrigate approximately one acre at each setting. In the cited example, the pipes 14 to 25 and 46 may be four inches in diameter, while the pipes 33, 51 and 52 are two inches in diameter.

It will be apparent that the pipes 14 to 25 may also be conveniently arranged in a rectangular, as well as a square configuration, to form the main frame of the apparatus 12.

It should also be noted that the removable pipes 33, 46, 51 and 52 may be of any desired material, such as either rigid metal or plastic, or flexible hose or plastic, which is easily handled by a single operator. Furthermore, the caster assemblies 70 should be of a size to retain the apparatus 12 above growing plants (not shown) during movement of the apparatus. The inherent flexibility of the pipes 14 to 25, in conjunction with their swivel connections with the various fittings, allows the wheels 81 to raise and lower relative to each other when the apparatus 12 is pulled over rough terrain, without damage to the apparatus. With the substantially square configuration of the apparatus 12 the surface exposed to wind pressure is small relative to the size of the apparatus, and the apparatus will not be easily moved by the force of wind alone. Furthermore, the exact positioning of the apparatus 12 may be varied to provide an efficient irrigation operation during varying winds, without increasing the number or location of the laterals 102.

From the foregoing it is apparent that the present invention will facilitate the irrigation of large fields. The fixed pipe portions of the apparatus provide a frame for the apparatus as well as conduct the irrigation fluid to the various sprinklers. The present apparatus need be moved a minimum number of times for irrigating a large field, and the movement can be made with a minimum of manpower. Wind will not materially affect the apparatus, and the irrigating pattern will not be substantially disturbed by varying wind velocities. Furthermore, the apparatus is simple in construction and may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A portable irrigation apparatus for dispensing irrigation fluid, comprising a plurality of caster assemblies, an irrigation pipe fitting secured on each of said caster assemblies and having a plurality of communicating pipe sockets therein, a plurality of pipes permanently secured at their opposite ends in said fittings in communicating relation and in a substantially square configuration to form a flow path for the irrigation fluid and supporting members for the apparatus, a plurality of irrigation conduits removably secured in the remaining sockets and extending outwardly from said first-mentioned pipes, and sprinklers communicating with all of said pipes and conduits for spraying the irrigation fluid.

2. A portable apparatus for dispensing irrigation fluid, comprising a frame of irrigation pipes secured in communicating relation and forming a flow path for the irrigation fluid, a plurality of irrigation pipe fittings pivotally interconnecting said pipes, with each end of each irrigation pipe being secured to another irrigation pipe of the frame, at least one additional irrigation pipe removably secured to each fitting around the edge of said frame in communication with said frame, a plurality of sprinklers on said frame and said last-mentioned pipes, and a caster assembly supporting each of said fittings for moving said frame as a unit.

3. An irrigation apparatus, comprising a substantially square frame of irrigation pipes secured in communicating relation, fittings pivotally interconnecting said pipes, with each end of each irrigation pipe being secured to another irrigation pipe of the frame, irrigation pipes of substantially the same size as the first-mentioned pipes removably secured to the fitting at each corner of the frame, said last-mentioned pipes being arranged in parallel relation, one of said last-mentioned pipes being the inlet for fluid to the frame, sprinkler means on the frame and said removable pipes for dispensing the irrigation fluid, and a caster assembly under each of said fittings for moving the frame in any direction as a unit.

4. An irrigation apparatus, comprising a substantially square frame of irrigation pipes, fittings pivotally interconnecting said pipes, an irrigation pipe of substantially the same size and length as the first mentioned pipes removably secured to the fitting at each corner of said frame, said second-mentioned pipes being extended in a parallel relation, one of said second-mentioned pipes being the inlet for irrigation fluid to the frame, a smaller diameter irrigation pipe of substantially the same length as said first-mentioned pipes secured to each of the outermost fittings of the frame and extending outwardly at right angles from the frame, sprinklers on each of said fittings and on the outer ends of said second-mentioned pipes and the outer ends of said smaller pipes to dispense the irrigation fluid over a substantially square area, and casters supporting each of the fittings for moving said frame as a unit in any direction.

5. An irrigation apparatus, comprising a substantially square frame of irrigation pipes, fittings pivotally interconnecting said pipes, an irrigation pipe of substantially the same size and length as the first-mentioned pipes removably secured to the fitting at each corner of said frame, said second-mentioned pipes being extended in a parallel relation, one of said second-mentioned pipes being the inlet for irrigation fluid to the frame, a smaller diameter irrigation pipe of substantially the same length as said first-mentioned pipes removably secured to each of the outermost fittings of the frame and extending outwardly at right angles from the frame, a second smaller irrigation pipe removably secured to the fitting at each corner of the frame and extending outwardly from a center point in the frame, said last-mentioned pipes being of a greater length to position the outer ends thereof substantially in alignment with the outer ends of the adjacent removable pipes, sprinklers on each of said fittings and on the outer ends of said second-mentioned pipes and the outer ends of said smaller pipes to dispense the irrigation fluid over a substantially square area, and casters supporting each of the fittings for moving said frame as a unit in any direction.

6. A portable apparatus for dispensing irrigation fluid, comprising a substantially square frame of irrigation pipes secured in communicating relation and forming a flow path for the irrigation fluid, a plurality of irrigation pipe fittings pivotally interconnecting said pipes, with each end of each irrigation pipe being secured to another irrigation pipe of the frame, at least one additional irrigation pipe removably secured to each fitting around the edge of said frame in communication with said frame, a plurality of sprinklers on said frame and said last-mentioned pipes, a caster assembly supporting each of said fittings for moving said frame as a unit, and supporting means on said frame for supporting said removable pipes during movement of said frame.

7. A portable apparatus for dispensing irrigation fluid, comprising a frame of irrigation pipes secured in communicating relation and forming a flow path for the irrigation fluid, a plurality of irrigation pipe fittings interconnecting said pipes, at least one additional irrigation pipe removably secured to each fitting around the edge of said frame in communication with said frame, a plurality of sprinklers on said frame and said last-mentioned pipes, a caster assembly supporting each of said fittings for moving said frame as a unit, a pulley on each caster assembly around said frame, and cable means on each of said removable pipes extending through the respective pulley for facilitating installation and removal of said removable pipes.

8. An irrigation apparatus, comprising a substantially square frame of irrigation pipes, fittings pivotally interconnecting said pipes, an irrigation pipe of substantially the same size and length as the first-mentioned pipes removably secured to the fitting at each corner of said frame, said second-mentioned pipes being extended in a parallel relation, one of said second-mentioned pipes being the inlet for irrigation fluid to the frame, a smaller diameter irrigation pipe of substantially the same length as said first-mentioned pipes removably secured to each of the outermost fittings of the frame and extending outwardly at right angles from the frame, a second smaller irrigation pipe removably secured to the fitting at each corner of the frame and extending outwardly from a center point in the frame, said last-mentioned pipes being of a greater length to position the outer ends thereof substantially in alignment with the outer ends of the adjacent removable pipes, sprinklers on each of said fittings and on the outer ends of said second-mentioned pipes and the outer ends of said smaller pipes to dispense the irrigation fluid over a substantially square area, casters supporting each of the fittings for moving said frame as a unit in any direction, racks on said frame for supporting said second-mentioned pipes and the shortest smaller diameter pipes during movement of said frame, and means in said caster assemblies for supporting said longer pipes during movement of said frame.

References Cited in the file of this patent

UNITED STATES PATENTS

| | | |
|---|---|---|
| 1,255,777 | Norton | Feb. 5, 1918 |
| 1,387,256 | Griffin | Aug. 9, 1921 |
| 1,411,777 | Finley | Apr. 4, 1922 |
| 2,652,282 | Willetts | Sept. 15, 1953 |

FOREIGN PATENTS

| | | |
|---|---|---|
| 271,716 | Germany | Mar. 18, 1914 |